United States Patent
Allen et al.

(10) Patent No.: US 9,953,651 B2
(45) Date of Patent: Apr. 24, 2018

(54) SPEED PODCASTING

(75) Inventors: Corville O. Allen, Morrisville, NC (US); Albert A. Chung, Cary, NC (US); Binh C. Truong, Cary, NC (US); Kam K. Yee, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1341 days.

(21) Appl. No.: 12/180,906

(22) Filed: Jul. 28, 2008

(65) Prior Publication Data

US 2010/0023330 A1 Jan. 28, 2010

(51) Int. Cl.
*G10L 15/04* (2013.01)
*G10L 15/26* (2006.01)
*G10L 19/00* (2013.01)
*G10L 21/00* (2013.01)
*G06F 17/27* (2006.01)
*H04N 7/173* (2011.01)
*G06F 17/30* (2006.01)
*G06F 17/00* (2006.01)
*G06F 3/00* (2006.01)

(52) U.S. Cl.
CPC .................................. *G10L 15/26* (2013.01)

(58) Field of Classification Search
USPC ............ 704/251, 254, 231, 9, 235, 201, 10; 707/3, 737, 4, 2; 715/202, 256, 968, 700; 370/313; 709/204
See application file for complete search history.

(56) References Cited

U.S. PATENT DOCUMENTS

| 5,914,941 | A | * | 6/1999 | Janky | H04L 69/04 370/313 |
| 6,061,675 | A | * | 5/2000 | Wical | G06F 17/271 704/10 |
| 6,167,370 | A | * | 12/2000 | Tsourikov | G06F 17/272 704/9 |
| 6,466,901 | B1 | * | 10/2002 | Loofbourrow | G06F 17/2755 704/9 |
| 6,598,039 | B1 | * | 7/2003 | Livowsky | G06F 17/3043 |
| 7,207,003 | B1 | * | 4/2007 | Berstis | G06F 17/30905 707/E17.121 |
| 7,983,915 | B2 | * | 7/2011 | Knight et al. | 704/254 |
| 8,392,183 | B2 | * | 3/2013 | Weber | 704/231 |

(Continued)

OTHER PUBLICATIONS

SpeechSkimmer: a system for interactively skimming recorded speech by Barry Arons, ACM Transactions on Computer-Human Interaction, 1997.*

*Primary Examiner* — Neeraj Sharma
(74) *Attorney, Agent, or Firm* — Steven M. Greenberg, Esq.; CRGO LAW

(57) ABSTRACT

Embodiments of the present invention address deficiencies of the art in respect to podcasting and provide a method, system and computer program product for speed podcasting. In an embodiment of the invention, a speed podcasting method can include speech recognizing an audio portion of a podcast, parsing the speech recognized audio portion to identify essential words, and playing back only audio segments and corresponding video segments of the podcast including the essential words while excluding from playback audio segments and corresponding video segments of the podcast including non-essential words.

9 Claims, 1 Drawing Sheet

(56) References Cited

U.S. PATENT DOCUMENTS

| | | | |
|---|---|---|---|
| 8,661,035 B2* | 2/2014 | Jariwala | G06F 17/241 707/737 |
| 2002/0156632 A1* | 10/2002 | Haynes | G09B 7/04 704/270 |
| 2005/0177805 A1* | 8/2005 | Lynch | G06F 17/30663 715/700 |
| 2006/0190804 A1* | 8/2006 | Yang | G06F 17/248 715/236 |
| 2006/0271365 A1* | 11/2006 | Maes et al. | 704/254 |
| 2007/0130112 A1* | 6/2007 | Lin | G06F 17/3002 |
| 2007/0288435 A1* | 12/2007 | Miki et al. | 707/3 |
| 2008/0086303 A1* | 4/2008 | Sengamedu | G10L 13/00 704/231 |
| 2008/0155616 A1* | 6/2008 | Logan et al. | 725/93 |
| 2008/0168134 A1* | 7/2008 | Goodman | G06F 17/30867 709/204 |
| 2008/0221876 A1* | 9/2008 | Holdrich | G10L 21/04 704/201 |
| 2008/0276159 A1* | 11/2008 | Narayanaswami | G06F 17/241 715/202 |
| 2008/0282153 A1* | 11/2008 | Kindeberg | G06F 17/274 715/256 |
| 2009/0030682 A1* | 1/2009 | VanSickle | G06F 17/3089 704/235 |
| 2009/0187516 A1* | 7/2009 | Kanungo | G06F 17/30864 706/12 |

* cited by examiner

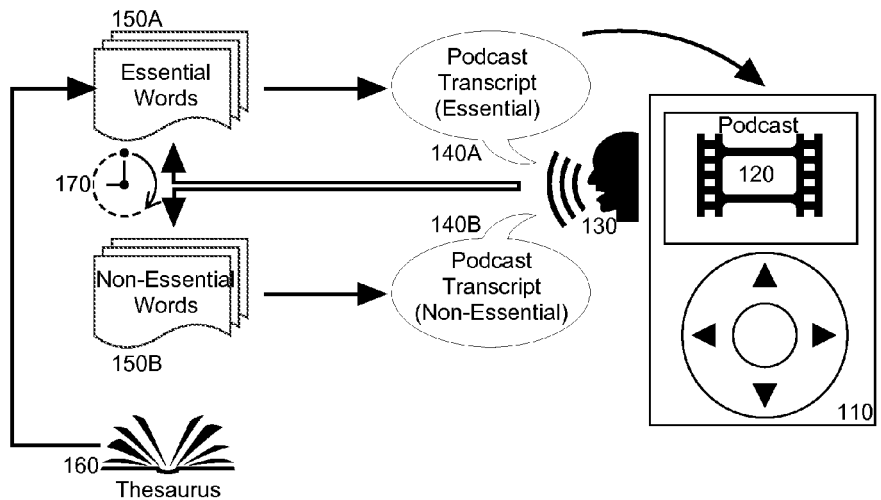
FIG. 1
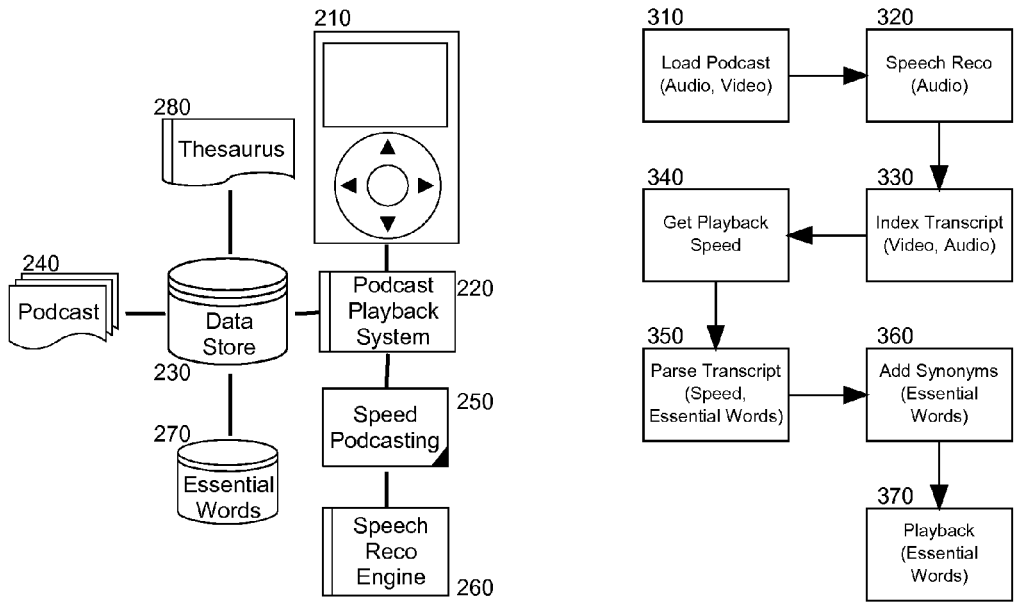
FIG. 2  FIG. 3

SPEED PODCASTING

BACKGROUND OF THE INVENTION

Field of the Invention

The present invention relates to the field of media playback and more particularly to the field of podcasting for computer communications networks.

Description of the Related Art

Historically, content has been disseminated for public consumption through each of the print medium, video medium and audio medium. Early forms of content publication relied exclusively upon print media such as newspapers, books and magazines. The early age of motion pictures provided an alternative mode of content distribution—typically through news reels preceding a feature film. Radio also provided a mode of content distribution in which consumers listen to content rather than view or read content. The dawn of television further advanced the distribution of content in an audiovisual medium to a degree rivaling print media. The explosive adoption of the World Wide Web as a primary source of content for consumption, however, remains unprecedented.

Media storage and handling technologies including modern audio and video compression algorithms when merged with the accessibility of the World Wide Web, provide for wide variety of modes of content distribution to please every conceivable type of prospective content consumer. Through the gateway of a simple Web page, content browsers can retrieve text, imagery, audio, video and audiovisual materials with a single click of a mouse button. Recent advances in broadband connectivity render the exercise of streaming media for viewing in a Web browser a simplistic exercise. However, most media browsing technologies of the Internet require persistent connectivity to the Internet.

Notwithstanding, computing users of today are a mobile sort and seldom enjoy broadband connectivity at all times. Yet, computing users have become accustomed to consuming network distributed media content at all hours—particularly at home, while exercising or when traveling out of range of wireless network connectivity. Capitalizing on the mobile nature of computing users, well known large manufacturers of consumer electronics have engaged in a protracted effort to manufacture mobile media playback devices enabled to retrieve and store content from over the Internet—particularly music and videos—and to permit playback through the devices while lacking a network connection at a subsequent time.

Arising out of this protracted effort, new forms of media have been developed to capitalize on the nature of the mobile content consumer. Podcasting represents one such new form of media. A podcast is a brief segment of audiovisual material recorded for distribution to mobile video playback devices for playback that is not dependant upon network connectivity. Podcasts are periodic in nature in that end users often subscribe to a podcast and in consequence of a subscription, new editions of the subscribed podcast are downloaded to the mobile video playback device as those new editions become available and as the mobile video playback device obtains network connectivity to the source of the new edition of the podcast.

Despite the utility of podcasts as a content distribution medium, podcasts lack some of the elemental convenience factors of traditional print media. For example, in traditional print media a content consumer can scan an article to quickly ascertain whether the article is of interest. To the extent the article is not of interest, there is no need for the content consumer to read the entire article. So much is not so with a podcast. In a podcast, the content consumer must listen to the entirety of the podcast in order to determine whether the podcast is of interest. Recent technologies attempt to address this shortcoming of podcasting through the speech recognition of the audio portion of a podcast to permit keyword searching of the relevant portions of the podcast. Exemplary products produce a heatmap within the playback control of the podcast to indicate where in the podcast a word of interest can be found.

BRIEF SUMMARY OF THE INVENTION

Embodiments of the present invention address deficiencies of the art in respect to podcasting and provide a novel and non-obvious method, system and computer program product for speed podcasting. In an embodiment of the invention, a speed podcasting method can include speech recognizing an audio portion of a podcast, parsing the speech recognized audio portion to identify essential words, and playing back only audio segments and corresponding video segments of the podcast including the essential words while excluding from playback audio segments and corresponding video segments of the podcast including non-essential words. In this regard, an audio segment can correspond to a phrase or sentence proximate to an identified essential word.

In one aspect of the embodiment, playing back only audio segments and corresponding video segments of the podcast including the essential words while excluding from playback audio segments and corresponding video segments of the podcast including non-essential words can include matching words in the speech recognized audio portion to essential words in a data store of essential words, determining audio segments of the audio portion including the matched words, and playing back the determined audio segments while excluding other audio segments of the audio portion from playback.

In another aspect of the embodiment, playing back only audio segments and corresponding video segments of the podcast including the essential words while excluding from playback audio segments and corresponding video segments of the podcast including non-essential words can include identifying non-essential words in the speech recognized audio portion, and excluding audio segments of the audio portion from playback including the identified non-essential words while playing back other audio segments of the audio portion.

In yet another aspect of the embodiment, the method also can include consulting a thesaurus to retrieve words synonymous with the matched words, and adding the synonymous words to the data store of essential words. In even yet another aspect of the embodiment, playing back the determined audio segments while excluding other audio segments of the audio portion from playback can include applying a rating to each word in the data store of essential words, associating a playback speed with each rating, excluding from the determined audio segments audio segments with essential words associated with a rating inconsistent with a contemporaneously selected playback speed, and playing back only the determined audio segments while excluding other audio segments of the audio portion from playback.

In another embodiment of the invention, a mobile video playback device can be provided. The device can include a computer program and system configured to playback podcasts stored in the mobile video playback device, a datastore of essential words, a speech recognition engine, and speed podcasting logic executing under management of the operating system. The logic can include program code enabled to speech recognize an audio portion of a selected podcast, to parse the speech recognized audio portion to identify words present in the datastore of essential words, and to play back only audio segments and corresponding video segments of the podcast including the matched words while excluding from playback audio segments and corresponding video segments of the podcast including non-essential words. Optionally, the device also can include a thesaurus such that the program code can be further enabled to locate in the thesaurus words synonymous with the identified words present in the datastore of essential words and to add the synonymous words to the datastore of essential words.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a schematic illustration of a process for speed podcasting;

FIG. 2 is a schematic illustration of a mobile podcasting playback device configured for speed podcasting; and, FIG. 3 is a flow chart illustrating a process for speed podcasting in the mobile podcasting playback device of FIG. 2.

DETAILED DESCRIPTION OF THE INVENTION

Embodiments of the present invention provide a method, system and computer program product for speed podcasting. In accordance with an embodiment of the present invention, an audio portion of a podcast can be speech recognized into a transcript and the words of the transcript can be filtered into a set of essential words and non-essential words. Thereafter, during a speed playback of the podcast, only the video and audio portions corresponding to the essential words can be played back while the portions of the video and audio of the podcast corresponding to the non-essential words can be skipped. Consequently, a content consumer speed podcasting a podcast can quickly ascertain the "gist" of the podcast without being compelled to listen to the entire podcast.

In illustration, FIG. 1 schematic depicts a process for speed podcasting. As shown in FIG. 1, a mobile video playback device 110 can be configured to playback a podcast 120 including synchronized audio and video portions. The audio portions 130 of the podcast 120 can be speech recognized to produce a transcript of both essential words 150A and non-essential words 150B. In this regard, non-essential words 150B can include articles, adverbs and adjectives not essential to the subject matter of the podcast 120, while essential words 150A can include nouns and verbs directed to the subject matter of the podcast 120. The placement of the nouns and verbs in a phrase can be determinative in classifying a word as non-essential or essential. Optionally, thesaurus 160 can be consulted to expand the essential words 150A to include synonymous words.

Once the speech recognized audio portions 130 of the podcast 120 have been parsed into essential words 150A and non-essential words 150B, only essential audio segments 140A of the audio portions 130 with essential words 150A can be played back during speed podcasting, while non-essential audio segments 140B of the audio portions 130 with non-essential words 150B can be omitted from playback of the podcast 120. As yet another option, some of the essential words 150A can be rated as more relevant than others of the essential words 150A. Consequently, a playback speed setting 170 can specify which of the essential words 150A are to be associated with the essential audio segments 140A during speed podcasting of the podcast 120.

In further illustration, FIG. 2 is a schematic illustration of a mobile podcasting playback device configured for speed podcasting. As shown in FIG. 2, mobile video playback device 210 can include a podcast playback computer program or system 220 and a data store 230 of podcasts 240. The podcast playback computer program or system 220 of the mobile video playback device 210 can be configured to playback selected ones of the podcasts including both audio and video portions of the selected ones of the podcasts. Speed podcasting logic 250 can be coupled to the podcast playback computer program or system 220 and also to a speech recognition engine 260. The speed podcasting logic 250 can include program code enabled to play back only audio segments of a selected one of the podcasts 240 that contains essential words 270 stored in the data store 230 and present in a transcript of the selected one of the podcasts 240 produced by speech recognition engine 260.

In operation, the program code of the speed podcasting logic 250 can direct speech recognition engine 260 to speech recognize an audio portion of a selected one of the podcasts 240 into a transcript. The program code of the speed podcasting logic 250 further can parse the transcript into audio segments containing words matching the essential words 270 disposed in data store 230 while excluding other audio segments (presumptively containing non-essential words). Optionally, thesaurus 280 can be consulted to identify words synonymous with the words matching the essential words 270 to augment the essential words 270 in the data store 230. In any event, a subset of audio segments of the audio of the selected one of the podcasts 240 can be produced that contain only essential words 270 in the data store 230. Finally, the program code of the speed podcasting logic 250 can direct the podcast playback computer program or system 220 to playback only the audio segments in the subset during a speed podcasting operation.

In yet further illustration of the operation of the mobile podcasting playback device, FIG. 3 is a flow chart illustrating a process for speed podcasting. Beginning in block 310, a podcast can be loaded including synchronized audio and video portions. In block 320, the audio portions of the loaded podcast can be speech recognized to produce a transcript and in block 330, the transcript can be indexed with the audio and video portions to maintain synchronization between the transcript, audio and video portions. In block 340, a playback speed can be determined for speed podcasting of the loaded podcast.

Thereafter, in block 350 by reference to a data store of essential words and also rules for characterizing different word types like articles and pronouns, adverbs and adjectives as non-essential in nature, the transcript can be parsed to filter out non-essential words and also essential words not having a rating high enough to meet a threshold value corresponding to the determined playback speed. Further, in block 360, additional words can be added to the data store of essential words that are synonymous with the essential words identified in the transcript.

Finally, in block 370, only audio segments indexed to correspond to the essential words in the transcript can be played back while audio segments indexed to correspond to the non-essential words in the transcript can be omitted. For instance, each audio segment can correspond to a phrase or sentence proximate to an identified essential word. As an example, a set of words beginning from zero or more words preceding an essential word and concluding zero or more words following the essential word can be considered an audio segment. As another example, all words leading from an essential word to a punctuation mark can be considered an audio segment.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A speed podcasting method comprising:
receiving a podcast of particular subject matter by a processor of a computer from over a computer communications network;
speech recognizing an audio portion of the received podcast by the processor of the computer into a transcript of both essential and non-essential words, the essential words comprising nouns and verbs directed to the particular subject matter, the non-essential words comprising articles, adverbs and adjectives not essential to the particular subject matter;
parsing, by the processor of the computer, the words of the transcript, filtering the transcript to exclude non-essential words leaving only essential words comprising nouns and verbs, and comparing the parsed words remaining in the filtered transcript with a set of essential words in a data store so as to identify each of the essential word speech recognized and present in the transcript;
processing each word parsed in the transcript and matched to an essential word in the data store to index a corresponding audio segment of the audio portion of the podcast;
selecting a playback speed for speed podcasting the received podcast;
determining a rating corresponding to the selected playback speed; and,
playing back each indexed audio segment corresponding to an essential word in the speech recognized transcript matched to a word in the data store and having a rating higher than the determined rating, while excluding from playback all audio segments not indexed to an essential word in the speech recognized transcript and all audio segments indexed to an essential word having a rating lower than the determined rating.

2. The method of claim 1, further comprising:
consulting, by the processor of the computer, a thesaurus to retrieve words synonymous with the matched word in the data store of essential words; and,
adding, by the processor of the computer, the synonymous words to the data store of essential words.

3. A mobile video playback device comprising:
an operating system executing in memory of a computer configured to playback podcasts stored in the mobile video playback device;
a datastore of essential words;
a speech recognition engine; and,
speed podcasting logic executing under management of the operating system comprising program code enabled to receive a podcast of particular subject matter, speech recognize an audio portion of the received podcast into a transcript of both essential and non-essential words, the essential words comprising nouns and verbs directed to the particular subject matter, the non-essential words comprising articles, adverbs and adjectives not essential to the particular subject matter, to parse each word of the transcript, filter the transcript to exclude non-essential words leaving only essential words comprising nouns and verbs, and compare the parsed words remaining in the filtered transcript with a set of essential words in a data store so as to identify each of the essential word speech recognized and present in the transcript, to process each word parsed in the transcript and matched to an essential word in the data store to index a corresponding audio segment of the audio portion of the podcast, to select a playback speed for speed podcasting the received podcast, to determine a rating corresponding to the selected playback speed, and to play back each indexed audio segment corresponding to an essential word in the speech recognized transcript matched to a word in the data store and having a rating higher than the determined rating, while excluding from playback all audio segments not indexed to an essential word in the speech recognized transcript and all audio segments indexed to an essential word having a rating lower than the determined rating.

4. The device of claim 3, further comprising a thesaurus, the program code being further enabled to locate in the thesaurus words synonymous with the identified words present in the datastore of essential words and to add the synonymous words to the datastore of essential words.

5. A computer program product comprising a non-transitory computer usable storage medium storing computer usable program code for speed podcasting, the computer program product comprising:

computer usable program code for receiving a podcast of particular subject matter by a processor of a computer from over a computer communications network;

computer usable program code for speech recognizing an audio portion of the received podcast into a transcript of both essential and non-essential words, the essential words comprising nouns and verbs directed to the particular subject matter, the non-essential words comprising articles, adverbs and adjectives not essential to the particular subject matter;

computer usable program code for parsing the words of the transcript, filtering the transcript to exclude non-essential words leaving only essential words comprising nouns and verbs, and comparing the parsed words remaining in the filtered transcript with a set of essential words in a data store so as to identify each of the essential word speech recognized and present in the transcript;

computer usable program code for processing each word parsed in the transcript and matched to an essential word in the data store to index a corresponding audio segment of the audio portion of the podcast;

computer usable program code for selecting a playback speed for speed podcasting the received podcast;

computer usable program code for determining a rating corresponding to the selected playback speed; and, computer usable program code for playing back each indexed audio segment corresponding to an essential word in the speech recognized transcript matched to a word in the data store and having a rating higher than the determined rating, while excluding from playback all audio segments not indexed to an essential word in the speech recognized transcript and all audio segments indexed to an essential word having a rating lower than the determined rating.

6. The computer program product of claim 5, further comprising:

computer usable program code for consulting a thesaurus to retrieve words synonymous with the matched word in the data store of essential words; and, computer usable program code for adding the synonymous words to the data store of essential words.

7. The method of claim 1, wherein speech recognizing the audio portion of the podcast by the processor of the computer comprises producing a transcript of the audio portion of the podcast.

8. The device of claim 3, wherein the program code of the speed podcasting logic enabled to speech recognize the audio portion of the selected podcast comprises program code to produce a transcript of the audio portion of the selected podcast.

9. The computer program product of claim 5, wherein the computer usable program code for speech recognizing the audio portion of the podcast comprises computer usable program code for producing a transcript of the audio portion of the podcast.

* * * * *